United States Patent [19]
Fister et al.

[11] 3,890,958
[45] June 24, 1975

[54] PHYSIOLOGICAL DIAGNOSTIC APPARATUS

[75] Inventors: Louis P. Fister, St. Louis; Robert Paine, University City, both of Mo.

[73] Assignee: Moog Automotive, Inc., St. Louis, Mo.

[22] Filed: Apr. 8, 1974

[21] Appl. No.: 459,108

[52] U.S. Cl. .............. 128/2 S; 73/65; 73/141 A; 128/2.05 B
[51] Int. Cl.² ............................................ A61B 5/10
[58] Field of Search .............. 128/2 S, 2 N, 2.05 B; 73/65, 172, 432, 142

[56] References Cited
UNITED STATES PATENTS

| | | | |
|---|---|---|---|
| 2,430,702 | 11/1947 | Bohannan | 73/65 |
| 2,735,291 | 2/1956 | Quinn | 73/65 |
| 2,819,612 | 1/1958 | Borgstrom et al. | 73/65 |
| 3,418,847 | 12/1968 | Nantz | 73/65 |
| 3,492,865 | 2/1970 | Johnson | 73/141 A |
| 3,504,540 | 4/1970 | Pradko et al. | 73/172 X |
| 3,712,294 | 1/1973 | Muller | 128/2 N |
| 3,826,145 | 7/1974 | McFarland | 128/2 S X |

FOREIGN PATENTS OR APPLICATIONS

| | | | |
|---|---|---|---|
| 1,002,866 | 9/1965 | United Kingdom | 128/2 N |
| 6,706,516 | 11/1967 | Netherlands | 128/2.05 B |

*Primary Examiner*—Kyle L. Howell
*Attorney, Agent, or Firm*—Ralph W. Kalish

[57] ABSTRACT

Physiological diagnostic apparatus for determining the location of, and shifts in, the center of gravity of the human body incorporating a body support member engaged upon a base assembly for pivoting about a transverse axis, a load responsive device located beneath said body support member in a portion thereof remote from its pivot axis, a processor for receiving signals from said load responsive device, and a readout instrument for accepting the output from said processor for display of the center of gravity behavior. Balancers are provided for eliminating the imposition of load upon said load responsive device caused by the weight of the support member and of the patient.

20 Claims, 17 Drawing Figures

PATENTED JUN 24 1975 3,890,958

SHEET 1

PHYSIOLOGICAL DIAGNOSTIC APPARATUS

BACKGROUND AND SUMMARY OF THE INVENTION

This invention relates in general to medical diagnostic devices and, more particularly, to an apparatus for determining the location of the center of gravity of the body and measuring the extent of shifts thereof.

Heretofore in the study of normal and abnormal phenomena within the human body, negligible, if any, attention has been directed to consideration of the importance of determining the location of, and shifts in, the center of gravity as an expedient productive of data of critical diagnostic value. Foremost examples of bodily functions affecting the center of gravity include breathing with lung contraction and expansion, and cardiac action with contraction and relaxation of the heart muscle in blood pumping. Digestive action with absorption of food and liquid from the stomach within the intestines also produces a center of gravity shift, and among conditions or states bringing about an abnormal displacement of the center of gravity are accumulation of blood and body fluid within the extremities after venous obstruction, and collection of peritoneal fluid as in liver disease or in cancer, among others. Thus, the behavior of the center of gravity due to its sensitive response to body functions and conditions provides a new dimension to the study of such, permitting of quantitative measurement.

Although various elaborate, sophisticated, and highly complex techniques and procedures have been developed, and are being used for measuring volume pressure and flow, none have been developed for observing and determining the influence of physiologic and pathologic processes upon the body center of gravity. Thus, current techniques for study of the heart includes X-rays (size and motion), electrocardiogram (electrical phenomena of the heart), phonocardiogram and external pulse recording (sounds and pulse waves). More sophisticated procedures include invasive techniques, with significant risks to the patient, with intracardiac catheter whereby pressure, flow, work can be determined. However, the inherent complexity and risk limit the application of these methods of study of the heart.

Prolonged continuous monitoring of cardiac function is presently electrocardiographic. Prior to the present invention, no effective method has been devised for studying cardiac function by analysis of the effects of cardiac action upon the center of gravity of the human body.

Determination of pulmonary ventilation is currently accomplished by spirometry. Heretofore, consideration has not been given to quantitation of the ventilation of the lungs by measurement of the shift of the center of gravity.

Observation of the movement of the center of gravity of the body wherein drug therapy is being undertaken provides beneficial information concerning the efficacy of the particular drug. Thus, drugs of many types may be so studied during the course of treatment, such as, for example only, vasodilators, diuretics, bronchodilators, and the like, and, accordingly, provides the physician with extremely important knowledge not attainable to the present time. Studies in the action of the center of gravity of the body permits of the rendition of data which is substantially limitless in scope and application; as organic functions, physiological conditions, pathologic states, and drug therapy are but examples of the myriad phenomena having a finite affect upon the center of gravity.

Therefore, it is an object of the present invention to provide a physiological diagnostic apparatus for measuring shifts in the center of gravity of the human body, as well as for locating same.

It is another object of the present invention to provide a physiological diagnostic apparatus of the character stated which is effective in determination of the functioning of various organs of the human body without necessitating insertion of instruments and the like into the patient, being, therefore, non-invasive, and without discomfort or risk to the patient, and without requiring the use of anesthesia or drugs.

It is a further object of the present invention to provide an apparatus of the character stated which permits of estimating the contractile state of the hart in a harmless, reliable fashion, of repeated estimation and continuous monitoring.

It is another object of the present invention to provide a physiological diagnostic apparatus of the character stated which is extremely sensitive for recording minimal center of gravity shifts; and which is adapted for repeated and/or serial measurement as for documenting the progress of a patient; his peculiar response to the disease; and his reaction to therapeutic procedures and medication.

It is a still further object of the present invention to provide a physiological diagnostic apparatus of the character stated which produces hitherto unobtainable information critical in the diagnosis and treatment of diseases and adapted for correlation with clinical information obtained from conventional sources for complementing same.

It is another object of the present invention to provide an apparatus of the character stated which provides estimation of ventilatory action without the need of masking, or intubation of a patient; and the use of which provides continuous monitoring of the ventilatory aspects of pulmonary function.

It is another object of the present invention to provide a physiological diagnostic apparatus of the character stated which is adapated for measuring shifts in the center of gravity of individual appendages of the human body.

It is a further object of the present invention to provide a physiological diagnostic apparatus of the character stated which may be utilized for serial measurements to evidence the condition of an organ, such as the heart after attack, or serial monitoring of center of gravity shifts, such as provoked by phenomena during a post-operative period as well as of the sequence of response of a patient to drug therapy or to the progress of a disorder.

It is a still further object of the present invention to provide an apparatus of the character stated which is conducive to rendition in a portable form for ready use at a required location.

It is a still further object of the present invention to provide an apparatus of the character stated which can be utilized without requiring highly trained technical personnel.

DESCRIPTION OF THE INVENTION

In essence, the present invention contemplates an apparatus for permitting measurements relative to center of gravity of the body, including precise anatomical location of the same; quantitation of the amplitude and direction of shift of the center of gravity within a preselected time interval responsive to the resultant of applied organic forces; quantitation of such amplitude and direction in response to an isolated organic phenomena; and a like quantitation with respect to the center of gravity in any appendage of the body. Obtained measurements may then be compared against accumulated experimental data for evaluation. The apparatus to be described hereinbelow is non-invasive in that the same does not involve the utilization of instruments or devices for use upon or within the human body so that the operation of the same is entirely without the least risk to the patient. Shifts in the center of gravity of the body being studied are measured through means converting load into an electric signal for driving a recording apparatus to permit visual registration.

Figure 1:
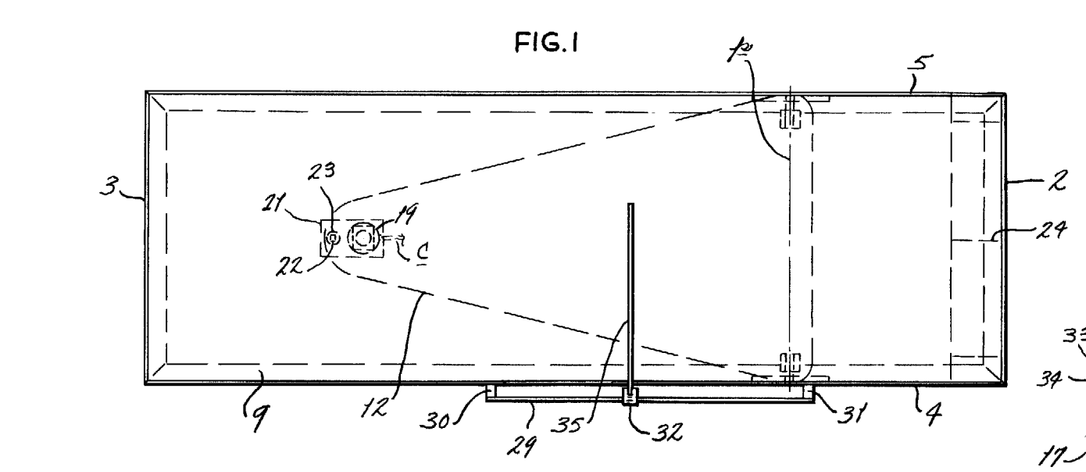
FIG. 1 is a top plan view of the platform of a physiological diagnostic apparatus constructed in accordance with, and embodying the present invention.
Figure 2:
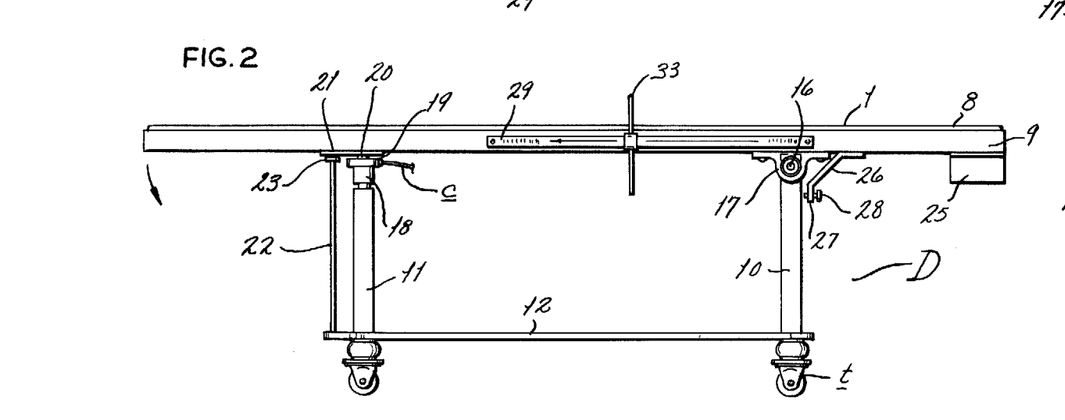
FIG. 2 is a side elevational view of the platform.
Figure 3:
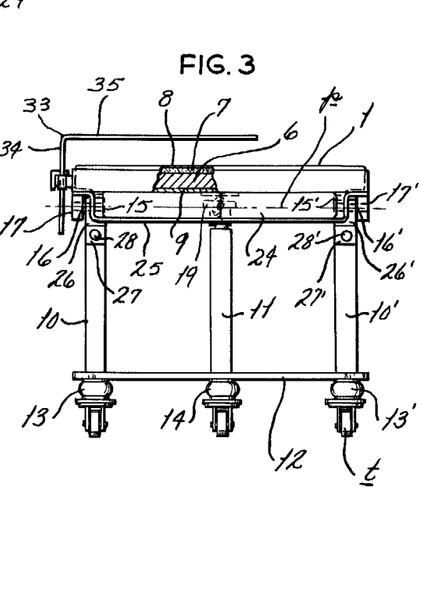
FIG. 3 is an end elevational view of the platform taken from the right-hand side of FIG. 1.

Referring now by reference characters to the drawings which illustrate practical embodiments of the present invention, D generally designates a physiological diagnostic apparatus comprising a flat platform or table top 1 for supporting a patient in horizontal position, the same being preferably, but not necessarily, of rectangular form, and having parallel ends 2,3 and parallel sides 4,5. Said platform may be of any desirable construction to provide requisite rigidity together with adequate comfort for the patient and may comprise a plate 6 having a cushion 7, as of foam rubber disposed thereon, with a protective sheet 8 disposed coveringly thereabout. Said platform 1 may be received within a retaining frame 9 of generally angle shape in cross-section. Platform 1 is normally disposed in horizontal position, as discussed more fully hereinbelow, being supported by three uprights 10,10',11, the lower ends of which are fixed upon a base plate 12; the latter being maintained in spaced relationship to the supporting surface, such as a floor, by foot members 13,13',14, respectively; which latter may be fabricated of resilient material to serve as isolators for inhibiting transference to the surmounted components of any vibrations from the floor which might tend to interfere with sensitive operation of apparatus D, as will be more apparent from the following. For rendering the device mobile, casters $t$ may be mounted beneath each of said foot members 13,13', 14.

Uprights 10,10' are in transversely aligned relationship immediately adjacent sides 4,5, respectively, of platform 1 and at their upper end each mounts, or is otherwise provided with, a self-aligning bearing 15,15', respectively, for journalling therein of a shaft 16,16', respectively, supported in their outer portions within companion self-aligning bearings 17,17', respectively, fixed upon frame 9 and depending therefrom. Shafts 16,16' are thus axially aligned and establish a transverse pivot axis, indicated $p$ (FIG. 3) about which platform 1 is pivotable.

Upright 11 is positioned spacedly from uprights 10,10', being equidistant therefrom, and being on an axis perpendicular to pivot axis $p$.

Upright 11 is of relatively reduced height, and at its upper end, downwardly from platform 1, mounts an overload protector 18 with a load measuring device 19 being fixed thereupon, which latter is provided with a load button 20 upon which rests platform 1 through a reaction plate 21 fixed on the undersurface thereof. Upstanding from base plate 12 adjacent upright 11, on the side thereof proximate the adjacent end 3 of platform 1 and located on an axis perpendicular to pivot axis $p$, is a vertical rod 22, the upper end of which terminates spacedly beneath the normal level of the underside of platform 1 and carries an enlarged, vertically adjustable head 23 for abutting the confronting portion of reaction plate 21 to serve as a positive stop-out for inhibiting pivoting of platform 1 when the particular load acting upon device 19 exceeds the peculiar limit thereof, causing overload protector 18 to move downwardly. With the pivot axis $p$ of platform 1 being eccentric thereof so that there would be a normal bias to pivot downwardly, as in a counterclockwise manner, indicated by the arrow in FIG. 2, said platform 1 may have mounted in its end portion adjacent pivot axis $p$ counterweights 24, as by means of a support 25. Thus, said counterweights 24 serve to minimize the static load on load measuring device 19 caused by the geometrical configuration of said platform 1. To limit clockwise pivoting of platform 1 there are provided brackets 26,26' extending downwardly from frame 9 on the side of pivot axis $p$ adjacent the proximate platform end, and having tongue-like lower ends 27,27', respectively, proximate the confronting end surface of uprights 10,10', respectively; with there being adjusting screws 28,28' carried by said ends 27,27', the manipulation of which permits control of the arc of pivot in such last mentioned direction. Spaced laterally outwardly of one side of platform frame 9, such as side 4, is an elongated indicator bar 29 maintained in position by means of spacers 30,31 fixed to the adjacent portions of frame 9. On its outer face, bar 29 has suitably inscribed graduations, as in inches, which commence from a point aligned with pivot axis $p$ toward the end of platform 1 proximate load measuring device 19, for measuring distances from said pivot axis $p$. Slideably mounted upon bar 29 is a rod holder 32 for mounting an angle-shaped indicator rod 33 having a vertical leg 34 supported in said holder 33 and having an upper horizontal leg 35 for presentation spacedly above platform 1 and being axially parallel with pivot axis $p$. Thus, by suitable positioning of holder 32 upon bar 29 the distance between any preselected point on a patient's body from the pivot axis $p$ may be determined for diagnostic purposes, as will be developed hereinbelow.

Figures 7, 8, 9:
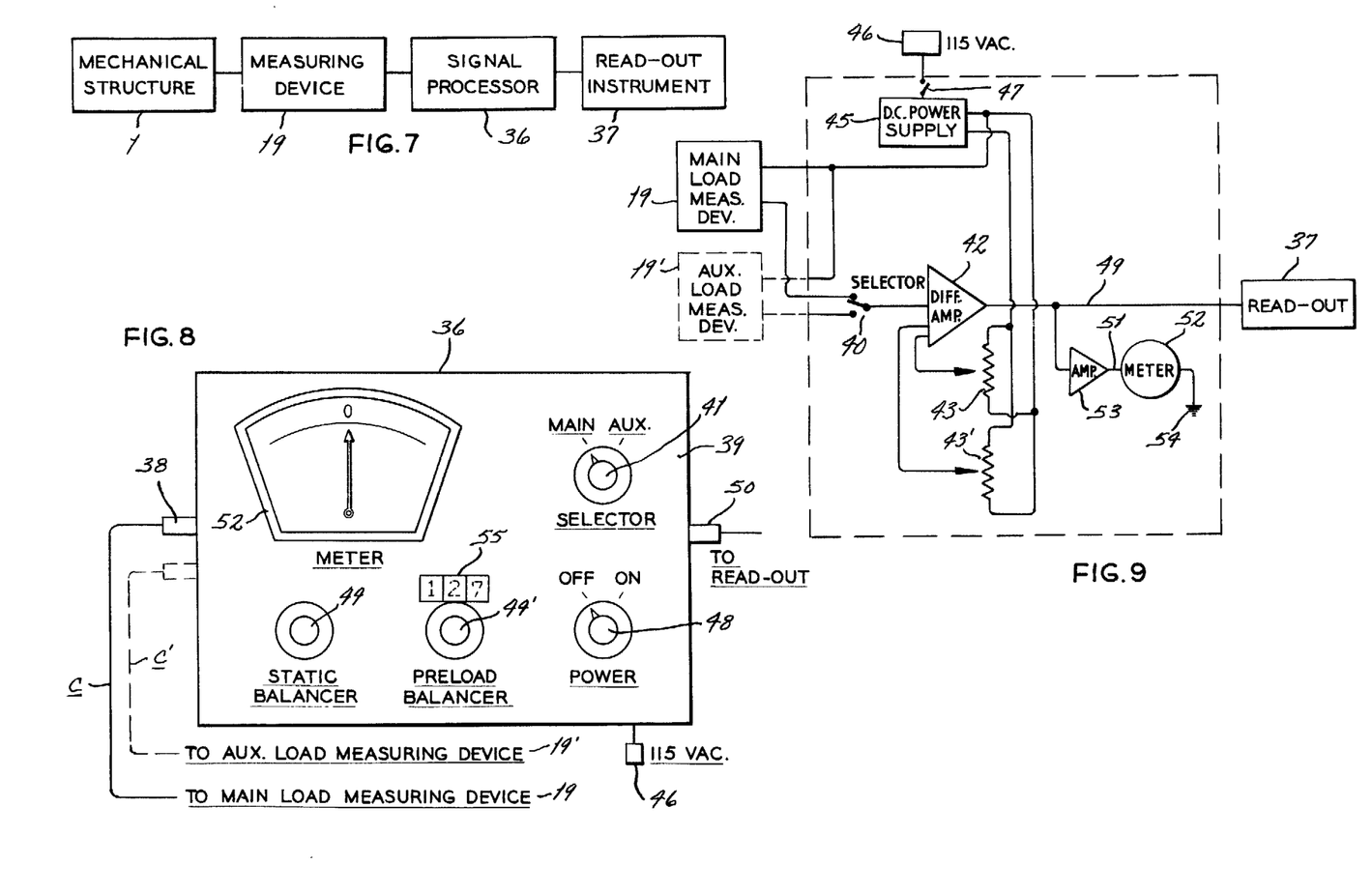
FIG. 7 is a schematic block diagram of the components of the diagnostic apparatus.
FIG. 8 is a front elevational view of the console of the signal processor.
FIG. 9 is a schematic wiring diagram of the basic circuitry of the signal processor of the present invention.

Load measuring device 19 may be of any suitable type for generating an output voltage which is a function of the load applied thereon. Accordingly, device 19 could be a strain gage, a piezo electric crystal type load cell, a transducer, or the like. The precise character of this device 19 does not form a part of the present invention. Said device 19 is connected by suitable leads, as within a cable $c$, to a signal processor unit 36, the output of which is connected to a read-out instrument 37; the latter not being shown in detail since its peculiar construction does not form a part of the present invention. Said read-out instrument 37 may be of currently available types, as for instance, oscillographs of the various types, an oscilloscope, computer, and the like. Thus, any instruments driven by the output of processor 36 for indicating variations in such output would be effective.

Referring to FIGS. 8 and 9, it will be seen that cable $c$ is connected to an input socket 38 of signal processor 36 which may be compactly contained within a console 39 for effecting portability and facile handling. The input to processor 36 is directed through a selector switch 40, having a control knob 41 on the front face of console 39. Said switch 40 is connected to a differential amplifier 42 which latter is also in circuit with two manually operated potentiometers 43,43' which are generically referred to hereinbelow as static balancer and preload balancer, respectively, each having a control knob 44,44', respectively, extending from the console front face for ease of manipulation. Balancers 43,43' are connected to a direct current power supply 45 as by suitable conductors connectable with a convenient outlet 46 for 115 V.A.C. as normally encountered in hospitals, doctors' offices, clinics, and the like. A main switch 47 having a control knob 48 upon the front face of console 39 is provided. The output of differential amplifier 42 is connected by a lead 49 and a socket 50 to read-out instrument 37. Also connected to the output of differential amplifier 42 by a conductor 51 is a meter 52, the face of which is exposed upon the front face of console 39 with their being an amplifier 53 disposed between said meter and differential amplifier 42;

the other side of meter 52 is grounded as at 54. In view of the foregoing it will be seen that signal processor 36 receives the output voltage from load measuring device 19 and after refinement of the same, for purposes to be described, amplifies the resultant signal to drive read-out instrument 37. The front face of console 39 also is provided with a window 55 for exposing a digital readout for preload balancer 43'.

Figure 10:
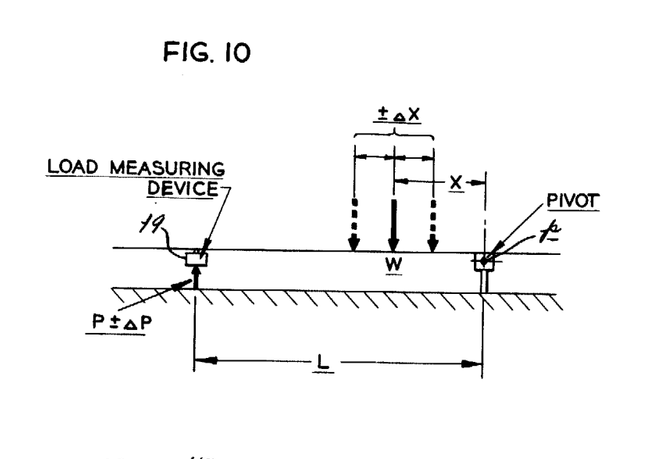
FIG. 10 is a force diagram.

Before describing the function of apparatus D of this invention, reference to FIG. 10 may be made for consideration of the fundamental principle underlying the operation thereof. FIG. 10 is a force diagram as relating to platform 1 with pivot axis $p$ and load measuring device 19 in their abovedescribed arrangement. Therein, P designates the load applied upon load measuring device 19 by the weight of the patient's body, which latter is designated $w$. The distance between pivot axis $p$ and load measuring device 19, which constitutes a first moment arm, is indicated L; while X, which indicates the distance between said pivot axis $p$ and the center of gravity of the patient's body, constitutes a second moment arm. Thus, by taking moments at pivot axis $p$ it will be seen that the distance of the center of gravity of the patient's body from pivot axis $p$ is represented by the equation $X = (PL/W)$. From this it can be readily noted that any shift in the center of gravity which may be toward or away from pivot axis $p$, being indicated by the symbol $\pm \Delta X$ will cause a corresponding alteration in the load applied upon load measuring device 19, with such alteration being indicated by the symbol $\pm \Delta P$. Simply expressed, should the center of gravity move in a direction toward pivot axis $p$ with a consequent reduction in the length of the second moment arm, then the load upon load measuring device will be reduced; and, conversely, should the center of gravity move away from pivot axis $p$, increasing the extent of said second moment arm, then the load upon load measuring device 19 will be commensurately increased.

From the foregoing it should be apparent that the relationship of platform 1, pivot axis $p$, and load measuring device 19, as shown in the drawings, are for purposes of example or illustration only. Obviously, counterweights 24 could be dispensed with if platform 1 were extended so that pivot axis $p$ would be more centrally located and thereby substantially eliminate the static load. Thus, the eccentric location of pivot axis $p$ is not requisite, but such, together with counterweights 24, conduce to a more compact, economically produced unit. The particular relationship of load measuring device 19 to pivot axis $p$ is determined by a multiplicity of factors, such as the weight of platform 1, the weight range of the patients to be accommodated, the capacity of said device 19 and the desired amplification gain. Thus, a load measuring device located near pivot axis $p$ would not require the same amplification gain as a device of like capacity presented more distant from said pivot axis $p$. Obviously, a device of greater capacity would require greater amplification than one of lesser capacity in the same relative position. The particular choice of amplification will be determined by the extent of the waveforms or other inscriptions provided by the read-out instrument. It is to be understood that the selected capacity of measuring device 19, the associated amplification gain, and the distance between device 19 and pivot axis $p$ may be easily determined within the foregoing general parameters by one having the usual skill in the art.

In use, load measuring device 19, by cable c, is connected to signal processor 36 through socket 38; control knob 48 is turned to "on" position; and control knob 41 is turned to "main" position for connecting said measuring device 19 with differential amplifier 42. After appropriate interval for warm-up of read-out instrument 37, processor 36 and measuring device 19, apparatus D must be balanced in order that the signal produced by the partial weight of platform 1 on measuring device 19 will be zero at the output of differential amplifier 42. This static balancing is effected by nulling meter 52 through manipulation of knob 44. At this juncture, read-out 55 of preload balance 43' will be zero. A patient is then placed upon platform 1 in a horizontal position, that is, either supine, face down, or on-the-side. Understandably, the patient should be so positioned with respect to load measuring device 19 so that a detectable load is applied thereon. For the purposes of apparatus D, a patient may have his head toward one end or the other of platform 1, but with the waveform provided at the read-out instrument being in correspondence. Therefore, any description hereinbelow with respect to the patient's head being at one end of platform 1 is to be understood merely for exposition; it being recognized, in view of considerations of economy and production, space requirements, measuring device capacities, etc. that pivot axis $p$ and load measuring deivce 19 may be spaced so that the average patient being accommodated may have a portion of this body overlying said pivot axis $p$ and another portion overlying measuring device 19. Concurrent tests may be made upon the patient while the present invention is being operated. For example, electrodes from a conventional electrocardiograph may be placed on the patient so that contemporaneous recordings may be effected. Such would also include the application of input sensors of any other measuring apparatus should recordings therefrom be required. However, as stated, the operation of apparatus D is functionally independent of any other such measuring equipment.

As it is most likely that a patient will be subjected to further or periodic measurements by apparatus D and thus would not expectedly be placed in the precise location on platform 1 on each occasion, it is critical that a referenced distance, as between the xiphoid process of the patient and the pivot axis $p$ be established for future comparison and compensation. The establishment of such reference distance is particularly important since the center of gravity of a patient may translocate through disease or as the result of treatment. Thus, for this purpose indicator rod 33 is utilized for measuring each time the patient is placed on platform 1. The xiphoid process of the patient is utilized as a reference point for measuring the distance between same and the pivot axis and such is accomplished by moving indicator rod 33 relatively of bar 29 so that horizontal leg 35 will immediately overlie the said xiphoid process. Thereon by reference to bar 29 the distance between pivot axis $p$ and said xiphoid process may be read from the scale on said bar 29.

Since the weight of the patient will effect a load upon load measuring device 19, the signal thereby generated must be balanced so that the output of differential amplifier 43' becomes zero. This balancing is effected by nulling meter 52 through manipulation of knob 44'. In view of this preload balancing consideration of the preload factor may be made. Thus, when knob 44' is turned for nulling meter 52, numbers will appear in window 55 which constitute a value referred to as the preload factor which is directly proportional to the load on load measuring device 19 produced by the weight of the patient and may be expressed by the equation $F = PK$ wherein F is the preload factor; P is the load acting upon load measuring device 19; and K is a constant being equivalent to the required ohm value to cancel electronically one pound load applied to load measuring device 19. For example, if $K = 6$; and the number in the window 55 is 127, then the load P equals 21.16 pounds.

Figure 11:
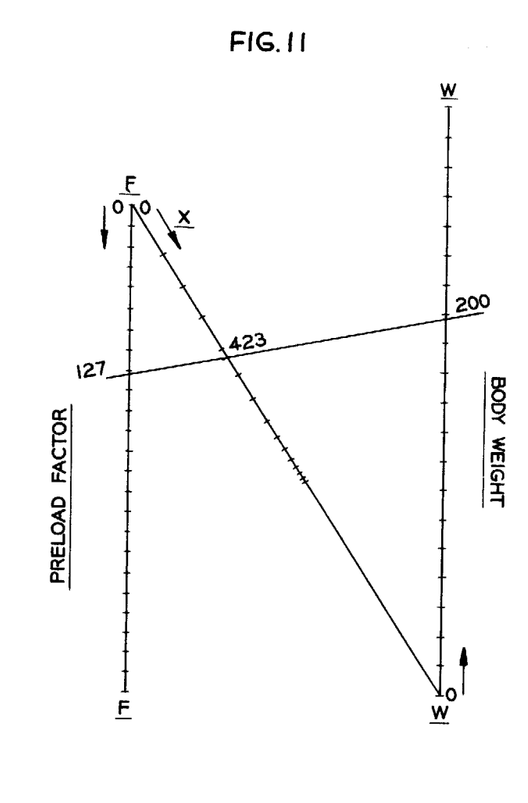
FIG. 11 illustrates the application of a nomograph for center of gravity determination.

By utilizing the basic equation above set forth, $X = (PL/W)$, with the knowledge of the patient's weight W; the distance L between pivot axis $p$ and load measuring device 19, and the load P upon loading measuring device 19, the distance X of the center of gravity from the pivot axis $p$ may be easily calculated. However, to avoid calculations a nomograph, as shown in FIG. 11, may be used wherein one scale for ready reference being indicated W is graduated to reflect body weight, and a second, axially parallel scale, demonstrated F, is graduated to indicate the preload factor as above set forth. A third scale, designated X, extending obliquely between scales W and F is graduated to indicate distances between the center of gravity of the patient and the pivot axis. Knowing the patient's weight and noting the numerals appearing in the preload balancer window 55 after nulling meter 52 immediately subsequent to disposition of the patient upon platform 1, a straight edge may be disposed between the corresponding points on the scales W,F, with the point of intersection on scale X providing the actual distance between the pivot axis and the patient's center of gravity. The actual distance thus determined, and the distance measured by the scale on bar 29, are then summed so that the distance between the actual center of gravity and the xiphoid process may be established for reference purposes as below discussed.

With the signal processor 36 balanced the measuring operation may then be initiated. With the patient remaining upon the platform 1, voltages generated by loading measuring device 19 are fed to signal processor 36 and therein amplified to constitute an output to read-out instrument 37 for recordation as upon a moving tape. Recordings may be effected upon one channel of a multi-channel tape as used in an E.K.G. recorder if desired. Such an arrangement is preferable in that the concurrent recordation of E.K.G. signals in waveform upon one channel of such tape permit of easy correlation with the waveform produced by the signals fed to the read-out instrument 37 by processor 36.

Before considering the waveforms generated by the signals produced during operation of apparatus D, a simple illustration may be illuminative. Upon contraction of the heart muscle, blood is pumped in a direction toward the patient's head into the aorta coincident with the carotid upstroke, so that understandably the center of gravity will momentarily be moved headward, thus causing a reduction in the second moment arm, as above discussed, and lessening the load applied upon load measuring device 19. Then as the blood is distributed downwardly within the body and toward the lower extremities, the center of gravity will shift toward the feet with a consequent increase in the load upon load measuring device 19. When it is considered that there are concurrently a multiplicity of phenomena occurring within the body having an affect upon center of gravity shifting, such as breathing, blood pumping, digested food migration, etc., the extent of shift will be determined by the resultant of these forces. However, if desired, body phenomena may be substantially isolated so that the peculiar effect upon displacement of the center of gravity can be measured.

Figure 16:
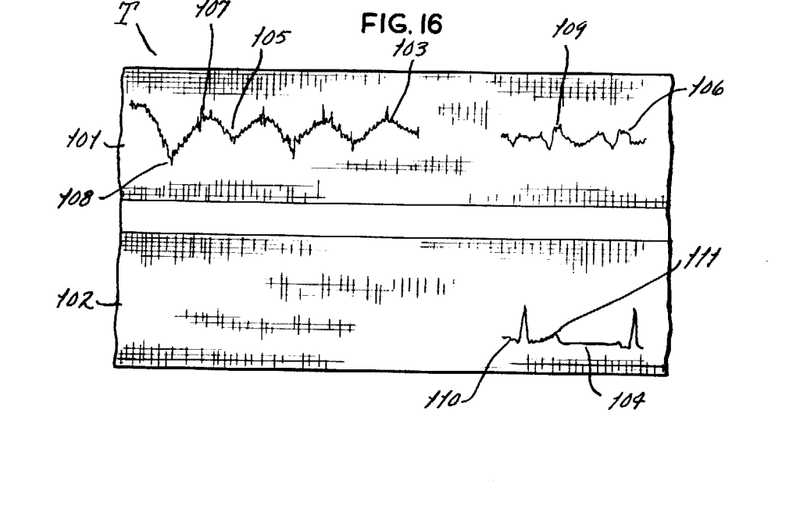
FIG. 16 is a view of a typical display of graphic recordings produced by the present invention.

The effectiveness of apparatus D may be appreciated by reference to FIG. 16 which illustrates a recording tape T having upper and lower channels 101,102 which carry waveforms 103,104 produced by signals from apparatus D and electrocardiograph (not shown), respectively. Tape T is lined in grid formation in accordance with a pre-established scale for measuring wave amplitude and wave duration, as viewed vertically and horizontally, respectively, in FIG. 16; or as considered transversely and longitudinally, respectively, of the baseline.

Upper waveform 103 is illustrated as comprising portions 105 and 106; the former portion being taken at a relatively slower rate and graphically delineates an alternating series of peaks 107 and valleys 108 by closely spaced markings, with said peaks and valleys being on opposite sides of the base line and respectively representing changes in the load applied on load measuring device 19 by virtue of the shifting of center of gravity headward and footward, respectively (that is, with the patient's head on platform 1 proximate pivot axis $p$). Waveform component 105 is of composite character indicating the shifts in the center of gravity or mass by the resultant of forces acting thereon, such as pulmonary, cardiac, and the like. Waveform component 106 graphically demonstrates the shifts in the center of gravity resulting from heart pumping action. Such recording is effected while the patient holds his breath so as to eliminate any affect from pulmonary action and thus permit speeding up of the recording procedure. Waveform component 106 includes a wave 109 which corresponds to the contraction of the left ventricle of the heart. The identification of this wave with such body phenomena is corroborated by reference to the E.K.G. waveform 104 wherein the QRS complex has its onset at point 110 and results from the electric signal generated by the contracting ventricle, but with such signal expectedly preceding the actual contraction. After the heart pumping action, the heart momentarily rests as indicated by the T wave 111 in E.K.G. wave 104 and by the drop, as it were, from the peak of wave 109 in waveform 103, which latter peak is vertically aligned with the peak of wave 111. By evaluating the amplitude of wave 109, that is, the extent of same from the baseline, the strength or power of the cardiac contraction may be arrived at. By determining the amplitude and duration or measurement of said wave 109 along said baseline, the stroke work of the heart muscle is determined. If the selected scale is such that a vertical distance of 10 mm equals, for example, 16 pounds/inches, and a distance of 5 mm horizontally or longitudinally of tape T indicates 0.2 seconds, the amount of work per time interval is easily calculated. Obviously, the slopes of the waves are indicative of the speed or rate; the steeper the slope, the more rapid the action.

Waveform 103 produced by the driving of read-out instrument by the amplifier circuit of signal processor 36 presents graphic data as to the physical capacities of the various organs measured so that the pumping strength of the heart, for instance, can be quantitated; as well as the capacity of the lungs.

Figure 17:
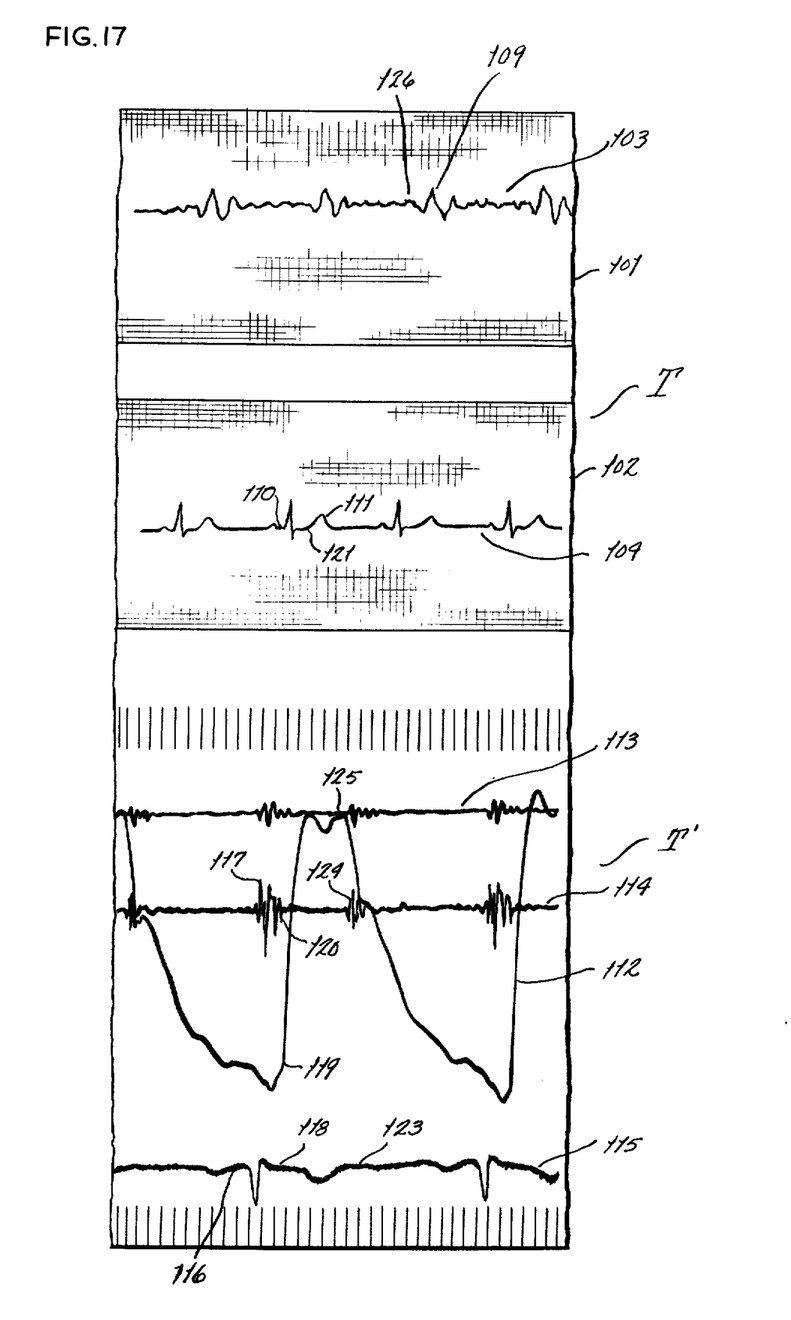
FIG. 17 is a view of a display of graphic recordings produced by the present invention as compared to recordings produced by other types of diagnostic apparatus.

FIG. 17 illustrates a portion of recording tape T above described as correlated with a phonocardiographic and pulse recording tape T', in which Figure like reference numerals will be utilized to indicate like waveforms; it being recognized that although the scales for said tapes T,T' differ, such will not interfere with the analogic purpose of said Figure. In Tape T', the carotid pulse, is indicated by waveform 112 while waveforms 113 and 114 are the conventional recordings of a phonocardiograph; while the E.K.G. waveform is shown at 115 which, as expected, will be reversed from waveform 104. By reference to the tapes T,T' in FIG. 17, the ready correlation of the center of gravity curve, as evidenced by waveform 103, with the precise events of the heart cycle, as determined by the E.K.G., pulse, and phonocardiographic recordings is evident. The events constituting the onset of the QRS complex (electrical signal) as at 116 and 110 of E.K.G. waveforms 115 and 104, respectively, the onset of mechanical systole, as at 117, in waveform 114, the onset of ejection (carotid upstroke) as at 118, 119, 120, 121 in waveforms 115, 112, 114 and 104, respectively, and termination of ejection, indicated at points 123, 124, 125 and 111 in waveforms 115, 112, 114 and 104, respectively, are manifestly relative to center of gravity waveform 103 wherein wave 109 indicates termination of ejection, while wave 126 marks the onset of ejection. Recognition of these relationships has provided measurement of cardiac cycle components by utilization of the center of gravity waveform 103 by itself.

With the foregoing fundamental examples in mind, it will thus be seen that apparatus D is useful in analysis of the contraction of the heart in health and disease, making possible new parameters in normal and abnormal cardiac function, as well as estimation of pulmonary ventilatory capacity by measurement of transportation of the center of gravity during respiration. Also determination of blood and fluid shifts in shock and in failure of the heart may be effected with serial determinations providing quantitative measurement of the patient's progress. Measurement of mass shifts within the body are helpful in detection of arterial and venous disease of the extremities as well as evaluation of gastrointestinal function. Also a shifting of the center of gravity resulting from drug therapy may be detected. In this situation, for instance, the response to drug acton may be analyzed. A change in cardiac waveform may reflect altered cardiac function, or a modification of respiratory function may be seen in the distortion of the cyclic baseline shifts produced by breathing. Or a shift in the baseline reflects quantitatively a transfer of body mass induced by drug action. Thus, pharmacologic affects upon (1) cardiac function, (2) pulmonary function, (3) distribution of body mass, can be evaluated independently, as well as dependently.

As pointed out hereinabove the scale on bar 29 measures the distance between pivot axis p and a reference point on the patient's body, such as the xiphoid process, for ease of location. Then by utilization of the preload balancer and resort to a nomograph, the precise distance between the patient's center of gravity and the pivot axis is established, all as above described. Accordingly, the doctor will then readily know what the distance may be between the aforesaid reference point and the patient's center of gravity. When a patient is submitted to apparatus D at a subsequent juncture, like determinations will be made in order to determine whether the distance between the said reference point and the patient's center of gravity has altered. Should there be some such translocation of the patient's center of gravity, the determination of such will provide critical information indicating, for example, accummulations of blood or body fluid within a particular zone of the body. From experimental data the normal location of the center of gravity of individuals of varying height and weight may be established and used as a standard for comparative purposes. Deviations from such standards whether headward or footward, may thus indicate development of abnormal conditions as resulting from edema, hemorrhage and the like. Determinations of this character may be considered static as compared to the recording of continuing shifts in the center of gravity by virtue of cyclic organic functioning.

The present invention may also be used for gaining information as to the vector of force representing recoil of the heart after ejection. For this purpose, a patient is serially placed upon platform 1 in two different locations so that the distance between the pivot axis and the center of gravity, as determined, or merely the reference point, as the xiphoid process, is measurably distinct. Thus, the length of the second moment arm as above described would be different. A comparison of the center of gravity waveforms as provided on tape portion 101 for the two positions would provide means of identifying (a) the shift of mass or center of gravity longitudinally of the body following heart action; and (b) the recoil of the heart to the ejection of blood. If the two resulting waveforms are identical, the recoil force will have a vector, or direction, parallel with the horizontal. However, should the second waveform, wherein the second moment arm is greater, differ from the first waveform, the change (provided there has been no other alteration in the patient), can be attributed to the vector or force representing recoil of the heart after ejection; that is, a vertical vector will create a waveform the size of which will be proportional to the distance of its origin from the pivot axis $p$. Thus, a vector of cardiac force can be measured in the horizontal and the vertical axes.

From the foregoing the usefulness of the present invention is apparent with the same providing information of critical diagnostic value, and with apparatus D causing no potential harmful affect upon the patient. Certain of the information presented by use of this invention was either heretofore unattainable, or, if attainable in part, only through techniques and procedures of grave risk to the patient.

Illustrative of clinical situations for application of apparatus D would be serial measurements of the state of the heart immediately after heart attack; serial monitoring of a post-operative patient in the recovery room whereby shifts of mass provoked by hemorrhage, shock, pulmonary dysfunction and the like could signal the early onset of complications; measurements to quantitate the response of the patient to therapy; and serial measurement of patients in shock.

Referring now to FIGS. 4, 5 and 6, 1' designates a platform adapted for use with apparatus D and having like support structure as platform 1 above described, with like components bearing like reference numerals, but being modified to permit determination of center of gravity shifts in selected individual portions, basically appendages, of the human body. Platform 1' thus comprehends a plate 6 with cushion 7 disposed thereon and a covering sheet 8 thereover. However, said platform 1' is fixedly maintained in the upper portion of a retaining frame 9' also angle-shaped in cross-section but having its horizontal or base flange 60 presented spacedly downwardly of platform plate 6. Supported upon said flange 60 is a continuous bottom plate 61 which, together with the underface of platform 1' and the intervening portions of frame 9', define a chamber or volume V; there being a plurality of spacers S provided therein for maintaining platform 1' in spaced apart relationship. Platform 1' is provided with a plurality of openings, as at 62, 63, 64, 65, 66, being preferably five in number for direct correspondence, and underlying relationship to, the appendages of the patient disposed on platform 1' whereby the aforesaid openings may respectively relate to a patient's left arm, head, right arm, left leg and right leg if the patient is in supine position and, obviously, just the reverse if face down. Normally, the aforesaid openings 62, 63, 64, 65, 66 are closed, as by means of a removable platform component 67; it being recognized that each of said components 67 are of like construction and are dimensioned for snug reception within the respective opening so that description of a single component will be sufficiently illustrative. It should be observed that each such opening 62, 63, 64, 65, 66 is of like dimensions so that economy in production may be achieved by having a single size component 67. Component 67 comprises a base plate 68, upon which are fixed spaced-apart upstanding spacers 69, upon the upper ends of which is mounted an upper plate 70, with there being a cushion 71 disposed on said plate 70 and with a protective sheet 72 covering said cushion 71 and being drawn downwardly for affixation of its marginal portions on the under-face of plate 68, as at 73. Thus, cushion 71 and sheet 72 are preferably of like material as cushion 7 and sheet 8 for consistency in comfort and appearance. Accordingly, platform components 67 constitute integral elements of platform 1' for rendering the top surface thereof continuous just as though it were unitary. The base plate 68 of each component 67 rests upon bottom plate 61 and with its lower portion being thus received within chamber V. With components 67 accepted within their respective openings, platform 1' is in condition for use in the same manner as platform 1', that is, for measuring shifts in the center of gravity of the patient's body.

Figure 4:
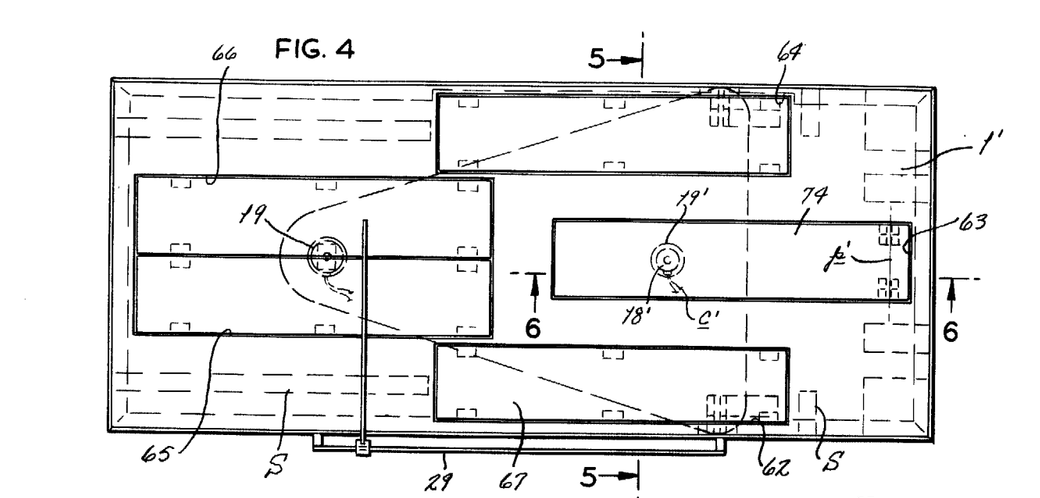
FIG. 4 is another form of platform of a physiological diagnostic apparatus constructed in accordance with and embodying the present invention.
Figure 5:
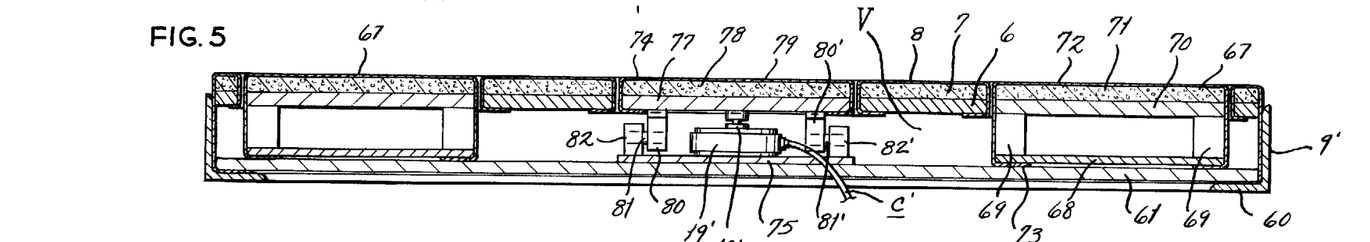
FIG. 5 is a vertical transverse sectional view taken on the line 5—5 of FIG. 4 and being rotated through an angle of 90°.
Figure 6:
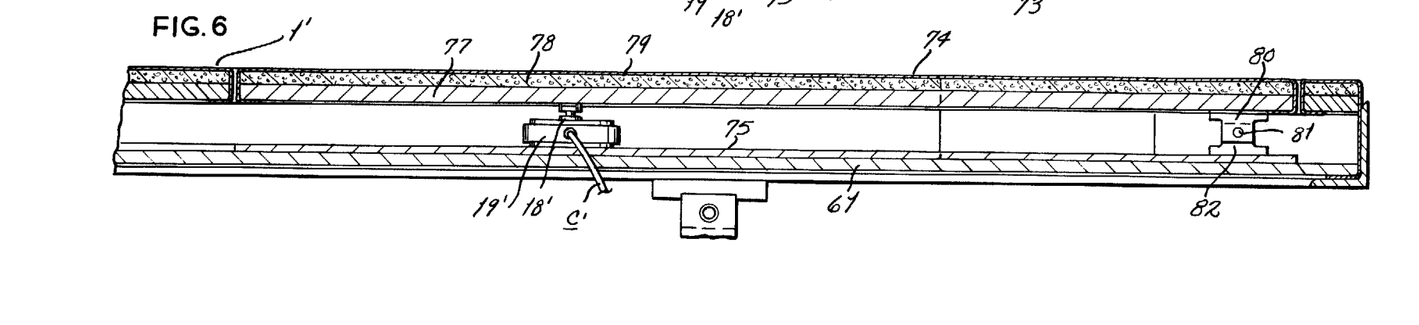
FIG. 6 is a fragmentary vertical transverse sectional view taken on the line 6—6 of FIG. 4.

Presented for substitution of any of said platform components 67 is an auxiliary unit or insert 74 which is of like dimensions as component 67 for disposition within any one of the selected openings 62, 63, 64, 65, 66. Auxiliary unit 74 comprises a base plate 75 for disposition upon bottom plate 61 and an upper plate 77 upon which is carried a cushion 78 with there being a protective sheeting 79 thereover; said cushion 78 and sheeting 79 corresponding to cushion 7 and sheet 8 of platform 1'. Depending from the underside of upper plate 77 are transversely spaced self-aligning bearings 80,80' for journalling therein of short axially aligned shafts 81,81', the outer portions of which are received within registering self-aligning bearings 82,82' mounted upon base plate 75. Said shafts 81,81' jointly establish a pivot axis $p'$. Supported upon base plate 75 spacedly from pivot axis $p'$ is an auxiliary load protection 18' which surmounts an auxiliary load measuring device 19' having leads as within a cable c' for connection to selector switch 40 of signal processor 36 (see FIGS. 8 and 9). Cable c' may be led outwardly through chamber V and through any suitable opening as within bottom plate 61.

Auxiliary unit 74 functions as a miniature, as it were, of platform 1 so that shifts in the center of gravity of the particular appendage or body portion disposed upon said unit will produce an output voltage at measuring device 19' for transmission to signal processor 36. Determination of the relationship between auxiliary load measuring device 19' and pivot axis p' is made pursuant to the same considerations as are involved in locating load measuring device 19 with pivot axis p as described hereinabove in conjunction with platform 1. Chamber V thus provides a requisite space for receiving the operational elements of the auxiliary unit 74. With said auxiliary unit 74 in use, the operator will turn selector switch knob 41 to AUX so as to thereby establish the circuit between load measuring device 19' and differential amplifier 42 whereby read-out instrument 37, after appropriate adjustment of static and preload balancers 43,43' through manipulation of their respective knobs 44,44' in the manner above described, will record the shifts in the center of gravity of the body portion involved.

From the foregoing it is evident that auxiliary unit 74 may replace the platform component 67 within any of the openings 62, 63, 64, 65, 66 for measurements with respect to the corresponding portion of the patient's body.

Figure 12:
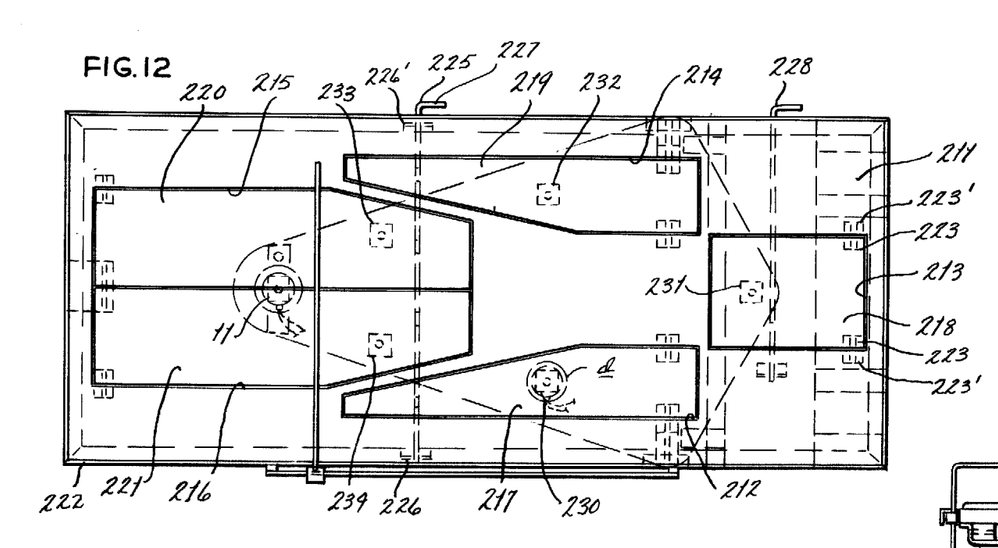
FIG. 12 is a top plan view of a further form of a platform of a physiological diagnostic apparatus constructed in accordance with and embodying the present invention.
Figure 13:
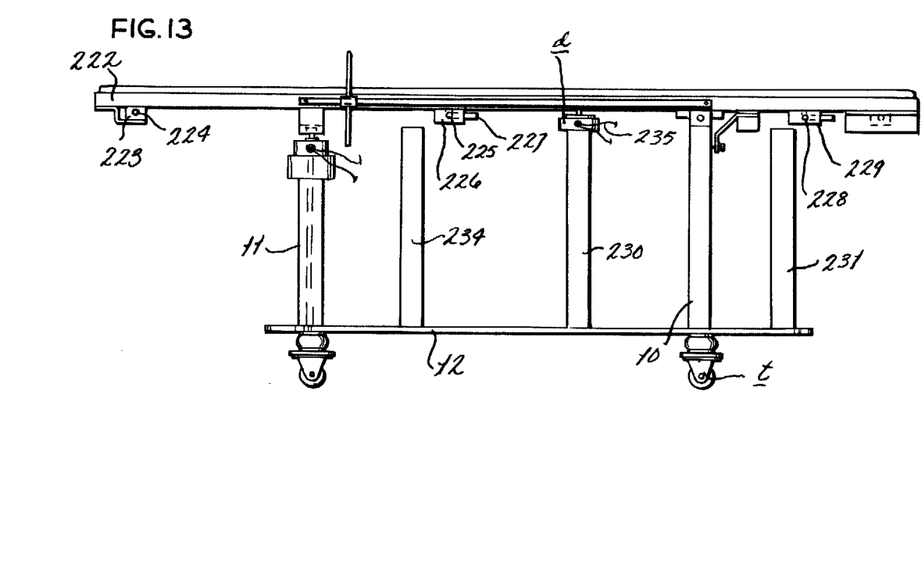
FIG. 13 is a side elevational view of the platform shown in FIG. 12.
Figure 14:
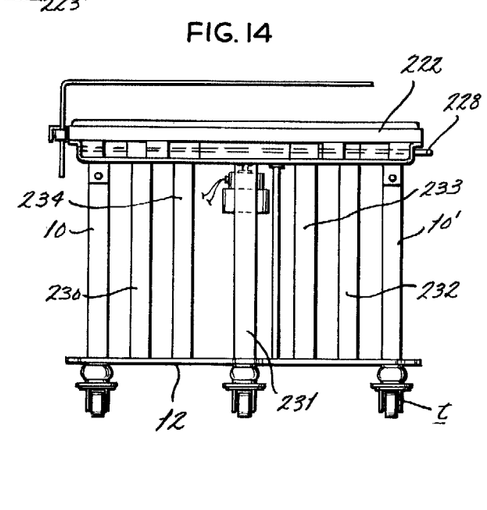
FIG. 14 is an end elevational view of the platform shown in FIG. 12 taken from the right hand side of said figure.

Turning now to FIGS. 12, 13 and 14, another form of platform 211 is illustrated for incorporation within apparatus D which platform 211 is basically structurally similar to platform 1 above described so that like components will bear like reference numerals. In this modification, platform 211 is provided with openings 212, 213, 214, 215 and 216 which are respectively positions for underlying the left arm, head, right arm, right leg, and left leg of a patient supine upon said platform 211; there being platform members or panels 217, 218, 219, 220 and 221, respectively, provided within the aforesaid openings and being of complementary contour thereto. Each of said platform members 217, 218, 219, 220 and 221 are hingedly mounted proximate one of their ends upon platform frame 222 as by transversely spaced-apart pairs of self-aligning bearings generally indicated 223,223', each of which pairs accommodates a short shaft 224 whereby a pivot axis is established for each such panel. Panels 212, 214, 215 and 216 are so designed that the respective end portions thereof remote from the related pivot axis overlie a control rod 225 which extends transversely beneath platform 211 and with its ends being received within aligned brackets 226,226' depending from the under surface of frame 222. At one of its ends said rod 225 incorporates a handle portion 227 for suitable manipulation in order to remove said rod from disposition beneath one or more of the aforesaid panels for freeing same at the related overlying end. A similar control rod 228 is mounted beneath platform 211 for underlying panel 218, as by brackets 229, so that upon withdrawal of the same, said panel 218 is freed for pivoting about its respective pivot axis.

Fixedly mounted upon base plate 12 are pedestals 230, 231 232, 233 and 234 which are respectively located beneath panels 217, 218, 219, 220 and 221, respectively, in their portions remote from their respective pivot axis. Each of said aforesaid pedestals terminates spacedly at their upper ends beneath platform 211 for selectedly supporting on such ends an accessory load measuring device d which is in all respects similar to load measuring devide 19. Thus, accessory measuring device d may be mounted on the upper end of the particular pedestal underlying the panel which supports the portion of the patient's body within which the center of gravity shift is to be measured. Said measuring device d is connectable to signal processor 36 as by leads encased within a cable 235.

Accordingly, platform 211 may be utilized in similar fashion as platform 1 above described, whereby the entirety of the same may serve, with rods 225,228 in panel supporting position, for determination of center of gravity shifts by voltage generated by load measuring device 19. Or, if desired, any of the aforesaid five portions of the patient's body may be subjected for determination of center of gravity shifts therein through appropriate disposition of accessory load measuring device d and operation of the selector switch 40; with the appropriate rod 225 or 228 having been manipulated for removal from supporting disposition with respect to the related panel.

Figure 15:
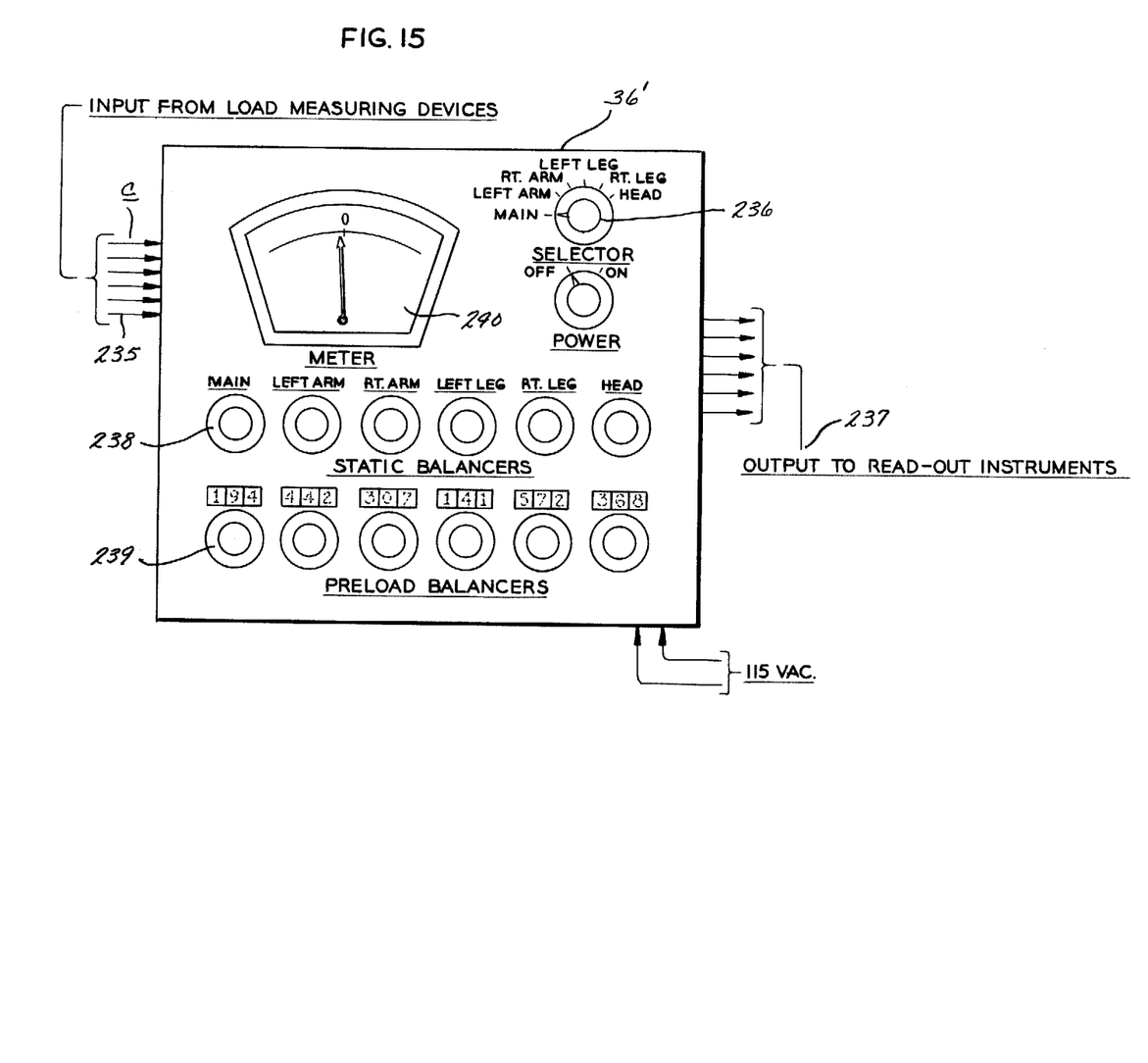
FIG. 15 is a front elevational view of the console of another form of signal processor for use with the present invention.

Referring now to FIG. 15, a modified signal processor 36' is illustrated which is of like character as signal processor 36 above described, but differs therefrom in permitting simultaneous processing of signals from more than one load measuring device. Said processor 36' is provided with a multiplicity of sockets (not shown) for connection to cable c for connection to load measuring device 19 and five cables, as 235, for contemporaneous connection to an accessory load measuring device d beneath each of the related panels of platform 211. Each of the cables c and 235 are connected through a multi-pole connector switch (not shown), but having a control knob 236 for connection through a processing system of the type hereinabove shown in conjunction with processor 36 with the output being connected by a suitable lead to a related readout instrument, as indicated at 237. Thus, processor 36' contains amplifying circuits for each connected load measuring device and with each such circuit having control knobs 238 and 239 for nulling the associated meter 240 for static and preload balancing, all in the manner as above described. Thus, control knob 236 is manipulated so that the static balancer and preload balancer for each load measuring device may be "nulled." However, it is to be understood that by this arrangement measurements are contemporaneously obtained with respect to the shifts of the center of gravity of the patient's body as well as in the particular portions thereof indicated. By mere reference to the associated read-out instruments, the doctor can determine the character of such shifts within all of the aforesaid zones.

Having described our invention what we claim and desire to obtain by Letters Patent is:

1. An apparatus for measurement of the extent of shifting of mass longitudinally within a patient's recumbent body resulting from visceral changes and changes of distribution of blood and extra-cellular body fluids comprising a flat platform dimensioned for receiving a patient's recumbent body thereon, said platform having opposed ends and side edges, a rigid support frame, rockable means mounting said platform on said frame for rockable movement about a pivot axis transversely of said platform, said rockable means inhibiting shiftable movement of said platform longitudinally and transversely and against lateral tilting, a load-actuated device provided beneath said platform and on one side of said pivot axis, said load-actuated device engaging the under face of said platform, signal processing means connected to said load-actuated device receiving signals therefrom and emitting output signals, means operatively provided with said signal processing means eliminating output signals caused by signals generated by said load-actuated device from the weight of said platform and from the weight of the patient's body, and means driven by said signal processing means for recording output signals developed by the shifting of mass within a patient's body in a direction longitudinally of said platform and within a plane substantially parallel to the plane of said platform.

2. An apparatus as defined in claim 1 and further characterized by means cooperating with said rockable means to present said platform in horizontal disposition when at rest.

3. An apparatus as defined in claim 1 and further characterized by said load-actuated device being located to engage said platform substantially intermediate its side edges.

4. An apparatus as defined in claim 1 and further characterized by said load-actuated device being a load cell productive of a voltage directly proportional to the load applied thereon.

5. An apparatus as defined in claim 1 and further characterized by said means operatively associated with said signal processing means being first and second balancers cancelling output signals caused by the weight of the platform and caused by the weight of the patient's body, respectively.

6. An apparatus as defined in claim 5 and further characterized by first and second manually operable control means for said first and second balancers, said first and second control means being independently operable.

7. An apparatus as defined in claim 5 and further characterized by said signal processing means comprising a differential amplifier, means connecting said differential amplifier to said load-actuated device, said first and second balancers being first and second potentiometers, respectively, first and second conductors connecting said first and second potentiometers, respectively, to said differential amplifier, and manually operable control means for said first and second potentiometers.

8. An apparatus as defined in claim 7 and further characterized by said manually operable control means for said first and second potentiometers being first and second operable independent control members.

9. An apparatus as defined in claim 1 and further characterized by cushioning means provided on said platform.

10. An apparatus as defined in claim 1 and further characterized by said means driven by said signal processing means being a graphic recording instrument.

11. An apparatus as defined in claim 1 and further characterized by graduated means provided on said platform and extending longitudinally thereof and having a portion aligned with the pivot axis thereof, and an indicator movable relatively of said graduated means whereby distances between said pivot axis and preselected locations on a patient's body may be determined.

12. An apparatus as defined in claim 1 and further characterized by detent means limiting the swinging of said platform.

13. An apparatus as defined in claim 1 and further characterized by the opposed ends and side edges of said platform being free.

14. An apparatus as defined in claim 1 and further characterized by manually operable control means connected to said means eliminating output signals.

15. An apparatus as defined in claim 1 and further characterized by said rockable means being located between the opposed ends of said platform.

16. An apparatus as defined in claim 15 and further characterized by the spacing between the load-actuated device and said rockable means being such as to allow portions of the patient's recumbent body to overlie said load-actuated device and said rockable means.

17. An apparatus to measure energy or power output of the heart and mass shifts in a human body comprising a base assembly, a platform assembly for supporting the human body, said platform assembly being pivotally mounted on said base assembly for swingable movement about a pivot axis, a load measuring device located between said base and platform assemblies at a predetermined distance from the said pivot axis, a signal processor connected to said load measuring device receiving signals therefrom and being productive of an output voltage, said signal processor comprising first balancing means cancelling signals produced by the weight of the platform assembly upon said load measuring device so that the output voltage from said signal processor is zero with respect to said weight, and second balancing means cancelling signals produced by the weight of the body upon said platform assembly upon said load measuring device so that the output voltage from said signal processor is zero with respect to said last mentioned weight, said signal processor providing resultant, conditioned output voltages produced by energy or power output of the heart or mass shifts in the body supported by said platform assembly, and a recording means driven by said resultant, conditioned output voltages.

18. An apparatus for measurement of the extent of shifting of mass longitudinally within a patient's recumbent body resulting from visceral changes and changes of distribution of blood and extra-cellular body fluids comprising a base structure, a platform dimensioned for receiving a patient's recumbent body thereon, said platform having at least one opening presented for underlying a predetermined portion of the patient's body, a platform component provided within said opening, having opposed ends and said edges and with an upper surface substantially coplanar with the upper surface of the platform, rockable means mounting said platform component for rockable movement about a pivot axis transversely of said platform component, said rockable means inhibiting shiftable movement of said platform component longitudinally and transversely and against lateral tilting, a load-actuated device provided beneath said platform component and between said rockable means and one opposed end of said platform component, said load-actuated device engaging the under face of said platform component, signal processing means connected to said load-actuated device receiving signals therefrom and emitting output signals, means operatively provided with said signal processing means eliminating output signals caused by signals generated by said load-actuated device from the weight of said platform component and of the portion of a patient's body supported on said platform component, and means driven by said signal processing means for recording output signals developed by the shifting of mass within said predetermined portion of a patient's body in a direction longitudinally of said platform component and within a plane substantially parallel to the plane of the said platform component.

19. An apparatus as defined in claim 18 and further characterized by said platform having a plurality of openings disposed for underlying predetermined portions of a patient's recumbent body on said platform, said platform component being dimensioned for selected disposition within one of said openings, and closure means for the others of said openings substantially alignable with the upper surface of the platform.

20. An apparatus as defined in claim 18 and further characterized by said platform having a plurality of openings disposed in said platform for underlying predetermined portions of a patient's recumbent body on said platform, a platform component provided within each of said openings, conductor means connecting the load-actuated device with each platform component to said signal processing means, and selector switch means provided with said conductor means between said load-actuated device and said signal processing means.

* * * * *